US006901697B1

(12) United States Patent
Stoller

(10) Patent No.: US 6,901,697 B1
(45) Date of Patent: **\*Jun. 7, 2005**

(54) PROTECTIVE WINTER TURF COVER

(76) Inventor: James E. Stoller, 814 Tuckaway Ct., Twin Lakes, WI (US) 53181

( * ) Notice: Subject to any disclaimer, the term of this patent is extended or adjusted under 35 U.S.C. 154(b) by 0 days.

This patent is subject to a terminal disclaimer.

(21) Appl. No.: 10/808,066

(22) Filed: Mar. 24, 2004

Related U.S. Application Data

(63) Continuation-in-part of application No. 10/032,652, filed on Nov. 13, 2001, now Pat. No. 6,739,088.

(51) Int. Cl.$^7$ .......................... A01G 13/00; A47G 7/08
(52) U.S. Cl. ...................... 47/31; 47/9; 47/2; 442/370; 442/372; 428/319.9; 428/338; 428/339; 428/424.8
(58) Field of Search ........................... 473/504; 47/32, 47/31, 20.1, 29.4, 29.1, 26, 23.1, 9, 2; 442/370, 442/327; 428/319.9, 338, 339, 424.8

(56) References Cited

U.S. PATENT DOCUMENTS

| | | | | |
|---|---|---|---|---|
| 983,857 | A | * | 2/1911 | Clarke ........................ 473/504 |
| 2,401,997 | A | * | 6/1946 | Whitman ........................ 47/31 |
| 3,863,387 | A | * | 2/1975 | Webster et al. .............. 47/29.1 |
| 3,864,198 | A | * | 2/1975 | Jackson ........................ 57/259 |
| 4,088,805 | A | * | 5/1978 | Wiegand ..................... 442/370 |
| 4,128,689 | A | * | 12/1978 | Heaps et al. ............. 428/317.1 |
| 4,267,665 | A | * | 5/1981 | Wallace et al. .............. 47/29.1 |
| 4,632,329 | A | * | 12/1986 | Burley ..................... 242/390.8 |
| 4,685,155 | A | * | 8/1987 | Fingerhut et al. .............. 2/272 |
| 4,798,023 | A | * | 1/1989 | Morssinkhof et al. ......... 47/32 |
| 4,980,991 | A | * | 1/1991 | Kipnees et al. ................... 47/2 |
| 5,070,643 | A | * | 12/1991 | Hinsperger .................... 47/31 |
| 5,262,233 | A | * | 11/1993 | Sudo et al. ................. 428/327 |
| 5,275,860 | A | * | 1/1994 | D'Luzanksy et al. ......... 428/71 |
| 5,401,118 | A | * | 3/1995 | Kramer ................... 405/129.9 |
| 5,532,043 | A | * | 7/1996 | Terashi et al. .............. 428/152 |
| 5,833,401 | A | * | 11/1998 | Olson .................... 405/129.75 |
| 5,981,020 | A | * | 11/1999 | Sutherland et al. ........... 428/85 |
| 6,074,966 | A | * | 6/2000 | Zlatkus ....................... 442/413 |
| 6,093,481 | A | * | 7/2000 | Lynn et al. ................. 428/217 |
| 6,115,960 | A | * | 9/2000 | Posa .......................... 47/20.1 |
| 6,127,027 | A | * | 10/2000 | Nogami et al. ............. 428/220 |
| 6,127,293 | A | * | 10/2000 | Kimura et al. ............. 442/199 |
| 6,168,840 | B1 | * | 1/2001 | Johnstone ................ 428/36.91 |
| 6,245,697 | B1 | * | 6/2001 | Conrad et al. .............. 442/370 |
| 6,739,088 | B1 | * | 5/2004 | Stoller ........................... 47/31 |

FOREIGN PATENT DOCUMENTS

CH 612321 * 7/1979 .......... A01G 13/02

* cited by examiner

Primary Examiner—Peter M. Poon
Assistant Examiner—Andrea M. Valenti
(74) Attorney, Agent, or Firm—Mathew R. P. Perrone, Jr.

(57) ABSTRACT

A protective winter turf cover is formed with a layered polyethylene laminated sheet with each layer having force striations running at an angle to the edge of the sheet and with the force striations of one layer at an angle to the force striations of the adjacent layer, the resulting turf cover being lightweight, compactly foldable, and substantially impermeable to water. The protective winter turf cover is efficiently held down with a dual apertured washer and x-position of nails therethrough.

2 Claims, 2 Drawing Sheets

PROTECTIVE WINTER TURF COVER

CROSS-REFERENCE TO RELATED APPLICATION

This application is a continuation in part of U.S. patent application Ser. No. 10/032,652, filed Nov. 13, 2001, now U.S. Pat. No. 6,739,088 by the same inventor, incorporated herein by reference.

This invention relates to a cover for turf, and more particularly, to a temporary protective winter turf cover for use on golf course greens, tee areas of a golf course and similar areas.

BACKGROUND OF THE INVENTION

The increased popularity of golf throughout the world has led to a substantial increase in the need for more golf courses. Additionally, every day, on which a golf course stays open if it would normally be closed, increases the effectiveness and profitability of the course. In the Northern climates, competitiveness to stay open as late in the fall and open as early as possible in the spring is the challenge faced by today's golf course superintendents.

One problem with existing green covers is that neither rapid cooling nor rapid warming can be prevented. Yet without this ability, the most undesired crown hydration occurs, usually in a very rapid fashion.

A protective turf cover must have at least five desirable qualities. Firstly, it must protect the turf from excessive moisture gain in the crown area. Secondly, it must protect the turf without over stimulating the turf to make it come out of the dormancy too early in the spring.

Thirdly, a cover must be easily removable if weather warms sufficiently in order to allow play to resume, at a time when the course is not otherwise playable. Large amounts of revenue can be lost in some climates if greens are covered, the weather warms enough to allow play, but too much time and money is needed to remove the green covers to allow play to be resumed.

Fourthly, any cover must last as long as possible. A life expectancy of at least three to more than seven years is a must to cut costs on reorders and old cover disposal.

Fifth, the covers must be fabricated from a material, which can be folded and stored into as small as space as possible.

SUMMARY OF THE INVENTION

Among the many objectives of this invention is the provision of a golf green cover, which permits a golf green to be used in efficient fashion.

A further objective of this invention is the provision of a golf green cover, which prevents crown hydration.

Yet a further objective of this invention is the provision of a golf green cover, which greatly reduces crown hydration.

A still further objective of this invention is the provision of a golf green cover, which is easily installed.

Another objective of this invention is the provision of a golf green cover, which is easily stored.

Yet another objective of this invention is the provision of a golf green cover, which is easily folded.

Still, another objective of this invention is the provision of a golf green cover, which is easily unfolded.

Also, an objective of this invention is the provision of a protective winter turf cover, which may be easily disposed of at the end of its useful life.

A further objective of this invention is the provision of a protective winter turf cover, which has repeated uses.

A still further objective would be to provide a cover, which will delay rapid cooling.

Yet a further objective would be to provide a cover, which will delay rapid warming.

Another objective of this invention is the provision of a golf green cover, which may held down more easily.

These and other objectives of the invention (which other objectives become clear by consideration of the specification, claims and drawings as a whole) are met by providing a protective winter turf cover from a layered polyethylene-laminated sheet with each layer having force striations running at an angle to the edge of the sheet and with the force striations of one layer at an angle to the force striations of the adjacent layer, thereby forming a turf cover, which is lightweight, compactly foldable, and substantially impermeable to water.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

In accordance with the present invention, a temporary protective winter turf cover, as a protective cover, is provided for a grass surface, especially a golf green. Any polymer capable of being formed into a light weight, flexible sheet is suitable for forming winter turf cover. In a preferred form, the protective winter turf cover is formed from at least one polyethylene sheet. The preferred polyethylene will be discussed below. Further discussion of the protective cover is found in the parent application incorporated herein by reference and need not be repeated herein.

Due to the particular structure of the cover, rapid cooling or rapid warming of the covered golf green is avoided. While it is not desired to bound by any particular theory, the following postulate is offered for this success. The impermeability of the cover combined with the ultra white color provides a cover which will substantially delay either rapid cooling or rapid warming. The ultra white reflects sunlight and delays heating. The impermeability prevents undesired water contact.

The turf cover of the present invention provides a protective turf cover that has many advantages. There are at least four outstanding advantages of this turf cover. First, the turf cover protects the turf from excessive moisture gain in the crown area. Second, the turf cover protects the turf without over stimulating the turf to make it come out of the dormancy too early in the spring. Third, a cover must be able to be easily removed if weather, typically winter weather, warms and allows play to resume. Fourth, a cover must be able to be easily replaced, when, again typically winter weather, if the weather cools and requires play to cease.

Fifth, covers must last as long as possible. A life expectancy of three to seven years is a must to amortize costs on reorders and old cover disposal. Fifth, the covers must be fabricated from a material, which can be folded and stored into as small as space as possible.

In this manner, even with the thin foam layer, such sheets can be easily stored and carry out the other desired functions.

Figure 1:
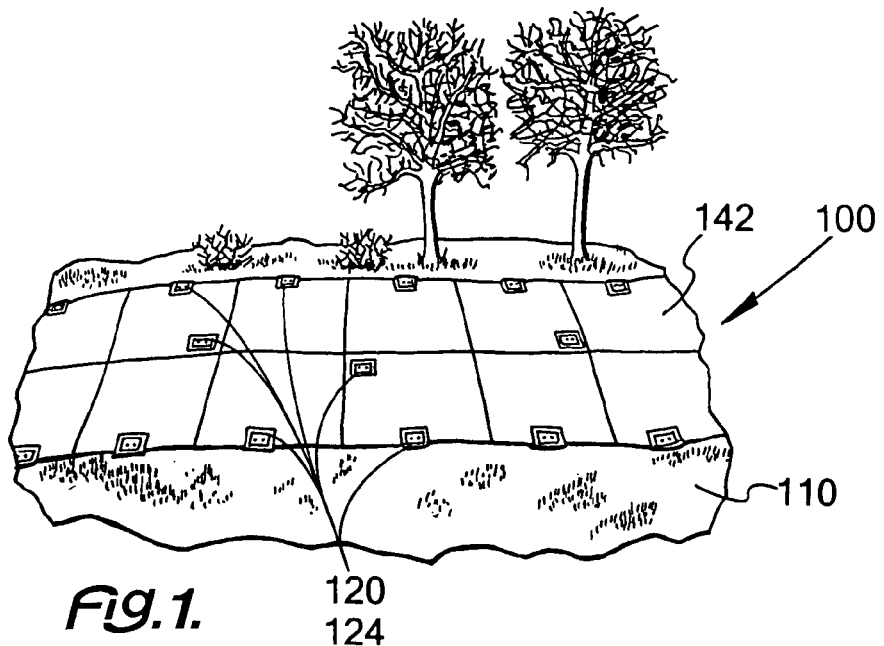
FIG. 1 depicts a perspective view of a winter turf cover 100 of this invention being installed on a golf green 110.
Figure 2:
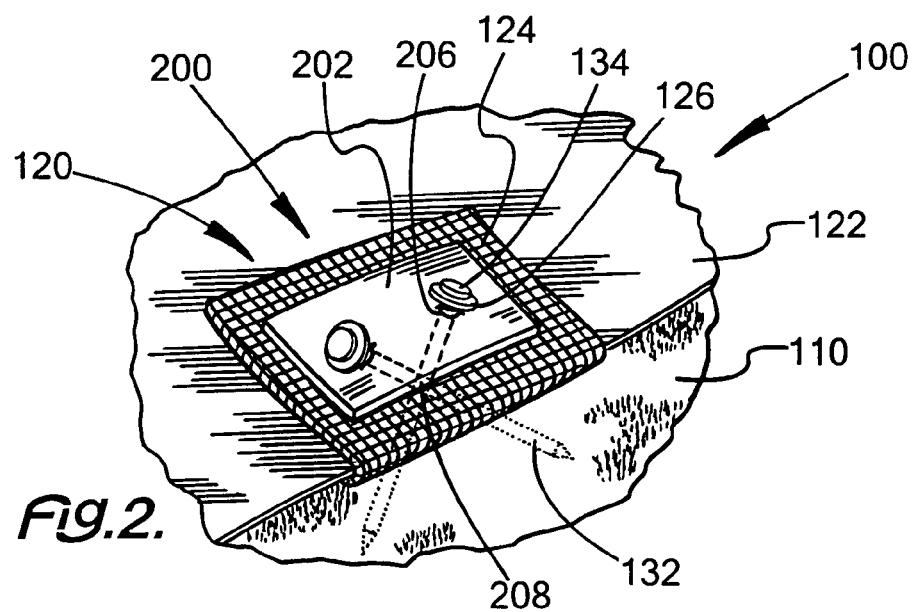
FIG. 2 depicts a perspective view of a ground holding device 120 for the winter turf cover 100 of this invention being installed on a golf green 110.

Referring now to FIG. 1 and FIG. 2, a winter turf cover 100 is placed over a golf green 110. The laminated structure of the winter turf cover 100 provides for a lightweight, substantially durable and water-impermeable material. By keeping water or snow from contacting or penetrating golf green 110, crown hydration during winter months of colder climates is avoided.

One part of ground holding device 120 includes at various positions in the fabric 122 of the winter turf cover 100 are reinforced tabs 124. Each reinforced tab 124 serves to receive a nail 132 or have nail 132 removed therefrom a plurality of times for panels 142 to form the winter turf cover 100 of this invention.

Through each reinforced tab 124 may have a nail 132 with a slide washer 126 between the nail head 134 and the reinforced tab 124 in order to hold turf cover 100 in place. Such reinforced tabs 124 are on one, two, three or four sides of a preferably rectangular fabric 122. Thus, each reinforced tab 124 and each nail 132 provide part of ground holding device 120.

With FIG. 2, the preferred form, double ground holding device 200 cooperates with reinforced tab 124 to provide an improved hold to keep winter turf cover 100 in position on golf green 110 and more efficiently resist the effect of wind thereon. Dual aperture washer 202 is placed over reinforced tab 124 after the winter turf cover 100 is placed on the green 110.

A nail 132 of any suitable length is driven through each member of the pair of nail apertures 206 into reinforced tab 124 and then into the green 110. Each nail 132 is angled so that nails 132 form a shape having basically an underground x-position 208. This structure greatly increases the hold down capability of the winter turf cover 100.

Figure 3:
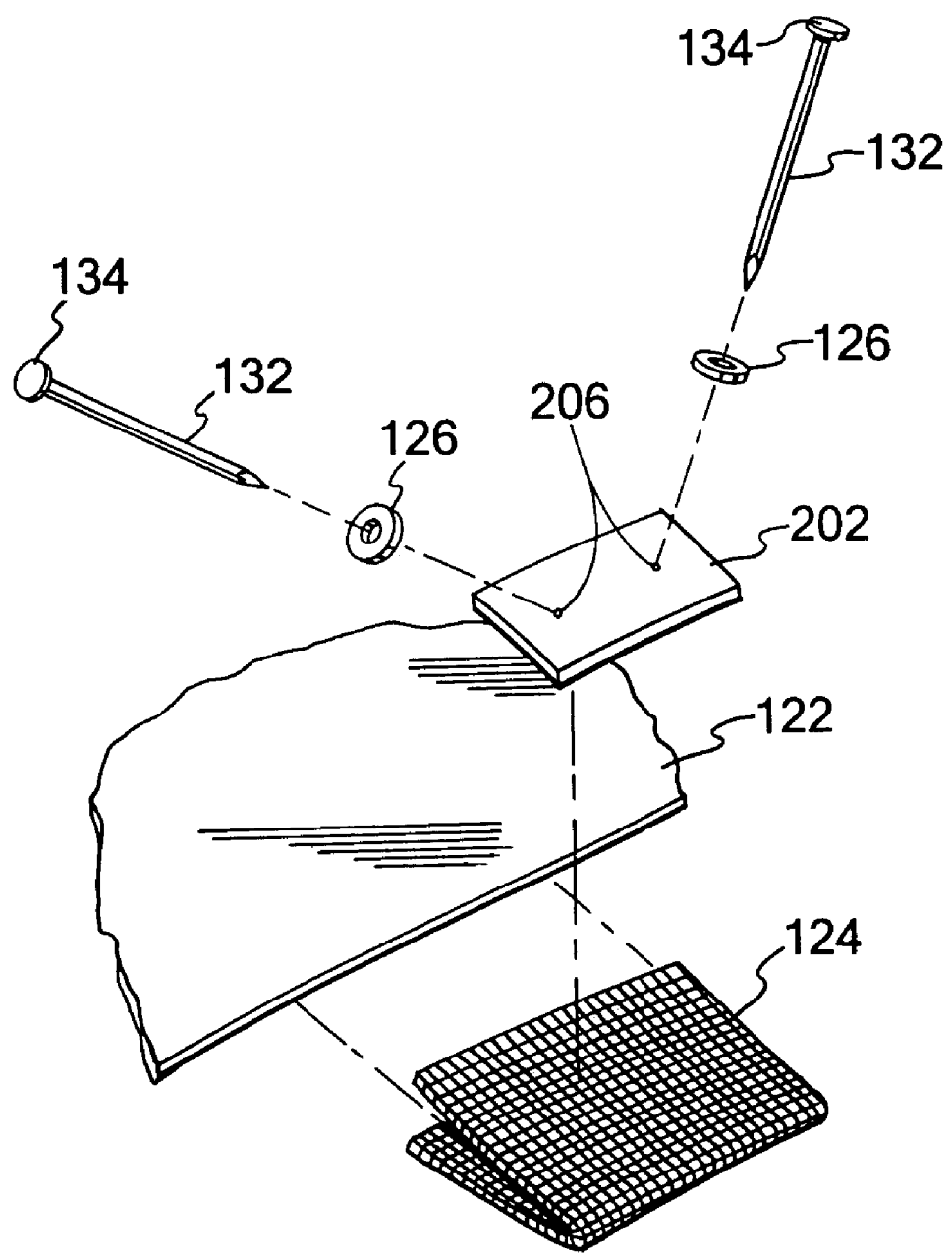
FIG. 3 depicts an exploded view of reinforced tab 124 for the winter turf cover 100.

Reinforced tab 124 as shown in FIG. 3 may be positioned anywhere on the fabric 122 by glue, friction or another suitable manner. Additionally, slide washer 126 may be positioned between dual aperture washer 202 and nail head 134 if desired. As many as desired of reinforced tab 124 are placed in various positions on the fabric 122. Reinforced tab 124 receives nail 132 as desired.

Dual aperture washer 202 may be made of rubber, plastic, metal or other suitable material. Preferably, the shape is rectangular, although any shape is suitable, so long as it sufficient for two apertures 206. Dual aperture washer 202 preferably has a circumference of 25 centimeters. More preferably, the circumference is 5 to 25 centimeters. Most preferably, the circumference is 10 to 25 centimeters.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. In a lightweight, compactly foldable, protective winter turf cover having:
    (a) at least one layered polyethylene sheet being substantially water impermeable;
    (b) the layered polyethylene sheet having at least a first layer and a second layer;
    (c) the first layer and the second layer each having a directional orientation determined by force striations;
    (d) the directional orientation of the first layer being at an angle relative to the directional orientation of the second layer;
    (e) the turf cover being durable;
    (f) the first layer having a first edge;
    (g) the second layer having a second edge;
    (h) the force striations being at an acute angle to the first edge;
    (i) the force striations being at an acute angle to the second edge;
    (j) the acute angle of the first edge being at a relative angle to the acute angle of the second edge;
    (k) the acute angle to the first edge and the acute angle to the second edge being 20 to about 70 degrees; and
    (l) the relative angle between the first layer and second layer being about sixty degrees to about 120 degrees; the improvement comprising a hold down mechanism cooperating with the winter turf cover, and having washer placed with the winter turf cover between a ground surface and the washer, the washer having two apertures adapted to receive a nail in each of the two apertures, with the nail being received in each of the two apertures so that nails cross underground in order to complete the hold down mechanism.

2. The lightweight, compactly foldable, protective winter turf cover of claim 1 further comprising a single aperture washer being between a head of the nail and washer having two apertures.

* * * * *